United States Patent
Sakamoto et al.

[11] Patent Number: 6,161,671
[45] Date of Patent: Dec. 19, 2000

[54] ELECTROMAGNETIC CLUTCH

[75] Inventors: Hiroyasu Sakamoto, Chiryu; Junichi Ohguchi, Toyoake; Yuuichi Aoki, Chita-gun; Toshihiro Hayashi, Chiryu; Yasuo Tabuchi, Toyoake, all of Japan

[73] Assignee: Denso Corporation, Kariya, Japan

[21] Appl. No.: 09/343,677

[22] Filed: Jun. 30, 1999

[30] Foreign Application Priority Data

Jul. 7, 1998 [JP] Japan ................... 10-192073

[51] Int. Cl.[7] .......................... F16D 11/00; F16D 19/00; F16D 27/00; F16D 37/02
[52] U.S. Cl. .................. 192/82 T; 192/84.961; 192/84.1
[58] Field of Search ............. 192/82 T, 84.961, 192/84.96, 84.1

[56] References Cited

U.S. PATENT DOCUMENTS 4,236,621  12/1980  Mukai et al. ................ 192/82 T
5,687,823  11/1997  Nakagawa et al. .......... 192/84.961

FOREIGN PATENT DOCUMENTS 57-51025  3/1982  Japan .

*Primary Examiner*—Charles A. Marmor
*Assistant Examiner*—Tisha D. Waddell
*Attorney, Agent, or Firm*—Pillsbury Madison & Sutro LLP

[57] ABSTRACT

An electromagnetic clutch has an armature, a rotor housing accommodating a stator housing and an exciting coil having negative and positive terminals. A passage is formed to extend from an outer peripheral surface of the stator housing to the negative terminal and the positive terminal. The passage is filled with a conductive metal member having a melting point lower than that of the stator housing between the outer surface of the stator housing and the negative terminal. When frictional heat generated between the armature and the rotor housing exceeds a preset value, the metal member melts and flows to the positive terminal, thereby short-circuiting the coil. As a result, a fuse between a power source and the clutch is fused, thereby turning off the clutch. Therefore, the clutch does not need to have a thermal fuse therein and is reduced in size without increasing power consumption.

21 Claims, 5 Drawing Sheets

ELECTROMAGNETIC CLUTCH

CROSS REFERENCE TO RELATED APPLICATION

This application relates to and claims priority from Japanese Patent Application No. 10-192073 filed on Jul. 7, 1998, the contents of which are hereby incorporated by reference.

BACKGROUND OF THE INVENTION

1. Field of the Invention

The present invention relates to an electromagnetic clutch which is preferably applicable to a compressor in a vehicle air conditioner.

2. Related Art

Conventionally, a compressor in a vehicle air conditioner is driven by power transmitted from a vehicle engine through an electromagnetic clutch, and operation of the compressor is controlled by turning on and off the clutch. However, when the compressor seizes due to some reason, a movable portion of the compressor may seize and stick, thereby locking the compressor. In this case, it is required to turn off the clutch so that power transmission from the engine to the compressor is stopped to protect the engine.

JP-A-57-51025 discloses an electromagnetic clutch used for a compressor and having a thermal fuse connected in series to an electric circuit therein. When the compressor is locked, the thermal fuse is fused by frictional heat generated between an armature and a rotor housing of the clutch so that the clutch is turned off.

However, in the above-mentioned clutch, the thermal fuse needs to be directly connected to the electric circuit adjacent to an exciting coil in the clutch. Therefore, the number of manufacturing processes of the clutch is increased, thereby decreasing productivity of the clutch and increasing production cost of the clutch. Further, the clutch needs not only a space for accommodating the thermal fuse but also a space for accommodating a connection portion between the thermal fuse and the electric circuit. As the result, a size of the clutch is increased.

The number of windings of the exciting coil may be decreased so that the size of the clutch is reduced. However, in this case, magnetomotive force induced by the exciting coil is decreased. As a result, electric power supplied to the exciting coil may need to be increased so that magnetomotive force of the exciting coil is restricted from decreasing. However, when power supply to the exciting coil is increased, power consumption of the exciting coil is also increased.

SUMMARY OF THE INVENTION

In view of the foregoing problems, it is an object of the present invention to provide an electromagnetic clutch which is reduced in size without increasing power consumption.

According to the present invention, an electromagnetic clutch for power transmission is supplied with power through a cut-off member which ceases power supply to the clutch when current flowing therethrough exceeds a predetermined value. The clutch has an exciting coil for generating a magnetic field, a housing for accommodating the coil, an armature being attracted to the housing when the magnetic field is generated and a short-circuit member for short-circuiting the coil when frictional heat generated between the armature and the housing exceeds a predetermined value. When the coil is short-circuited, the cut-off member is fused, thereby turning off the clutch. Therefore, the cut-off member does not need to be disposed in the clutch. As a result, the clutch is reduced in size in comparison with a conventional electromagnetic clutch having a cut-off member therein, without increasing power consumption. Further, since the clutch has no connection portion between the cut-off member and an electric circuit therein, there is no need to consider the fatigue strength of the connection portion. As a result, the reliability and durability of the clutch are improved.

Preferably, the coil is short-circuited between an initial winding end and a final winding end thereof. As a result, a structure of the short-circuit member is simplified.

More preferably, the short-circuit member includes a conductive member made of conductive material having a melting point lower than that of the housing. When the frictional heat exceeds a predetermined value, the conductive member melts, thereby short-circuiting the coil. As a result, a condition or a timing for short-circuiting the coil is readily determined by appropriately setting a melting point of the conductive member. Therefore, the short-circuit member does not need to be located adjacent to the armature to be sensitive to the frictional heat. As the result, a size of the clutch in an axial direction thereof is reduced.

BRIEF DESCRIPTION OF THE DRAWINGS

This and other objects and features of the present invention will become more readily apparent from a better understanding of the preferred embodiments described below with reference to e accompanying drawings, in which.

DETAILED DESCRIPTION OF THE PREFERRED EMBODIMENTS

Preferred embodiments of the present invention are described hereinafter with reference to the accompanying drawings.

(First Embodiment)

Figure 1:
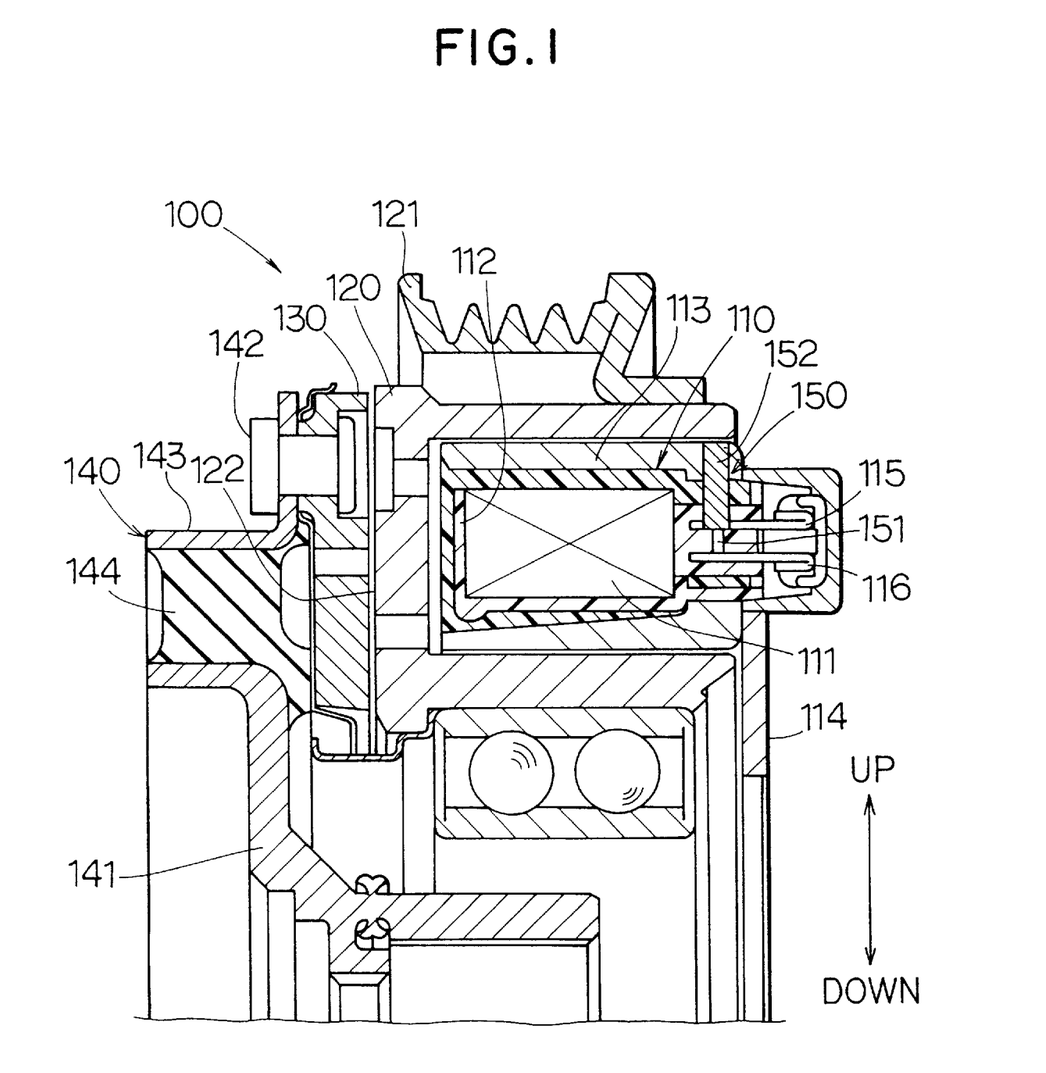
FIG. 1 is a half of a cross-sectional view showing an electromagnetic clutch according to a first preferred embodiment the present invention.

A first preferred embodiment of the present invention will be described with reference to FIGS. 1 and 2. Referring to FIG. 1, an electromagnetic clutch 100 transmits power from an engine (not shown) of a vehicle to a compressor (not shown) of a refrigerant cycle of an air conditioner of the vehicle intermittently. The clutch 100 has an exciting coil 111 which generates a magnetic field when supplied with power, and a spool 112 as a former for the exciting coil 111. Hereinafter, the exciting coil 111 and the spool 112 are collectively referred to as a coil 110. A stator housing 113 accommodates and holds the coil 110 so that the coil 110 is secured to a housing (not shown) of the compressor through a circular plate 114. A gap formed between the stator housing 113 and the coil 110 is filled with resin, thereby securing the coil 110 to the stator housing 113. The coil 110 is supplied with power through metal feeder terminals 115, 116. In the first embodiment, the terminal 115 is connected to a negative pole to be grounded and the terminal 116 is connected to a positive pole.

A pulley 121 is rotatably driven by the engine through a V-belt (not shown). A rotor housing 120 is welded to the pulley 121 to integrally rotate with the pulley 121. The rotor housing 120 accommodates the stator housing 113 and the coil 110, and forms a magnetic path for magnetic field generated by the coil 110 and the stator housing 113.

An armature 130 is attracted to a friction surface 122 of the rotor housing 120 due to electromagnetic force when the magnetic field is generated. The armature 130 is connected to a shaft (not shown) of the compressor through a hub 140. The hub 140 has a hub center 141, a holding member 143 and a transmitting member 144. The hub center 141 is connected to the shaft using a spline or the like to integrally rotate with the shaft. The holding member 143 is connected to the armature 130 through a pin 142. The transmitting member 144 is made of rubber and transmits power (i.e., torque) which has been transmitted to the holding member 143 through the armature 130 to the hub center 141 while absorbing torque change.

Further, a passage 115 is formed to extend from an outer peripheral surface of the stator housing 113 to the terminal 116 in a vertical direction in FIG. 1. A portion of the passage 115 between the outer peripheral surface of the stator housing 113 and the terminal 115 is filled with a metal member 152 made of conductive metal having a melting point lower than that of the stator housing 113. In the first embodiment, the metal member 152 is made of solder.

Figure 2:
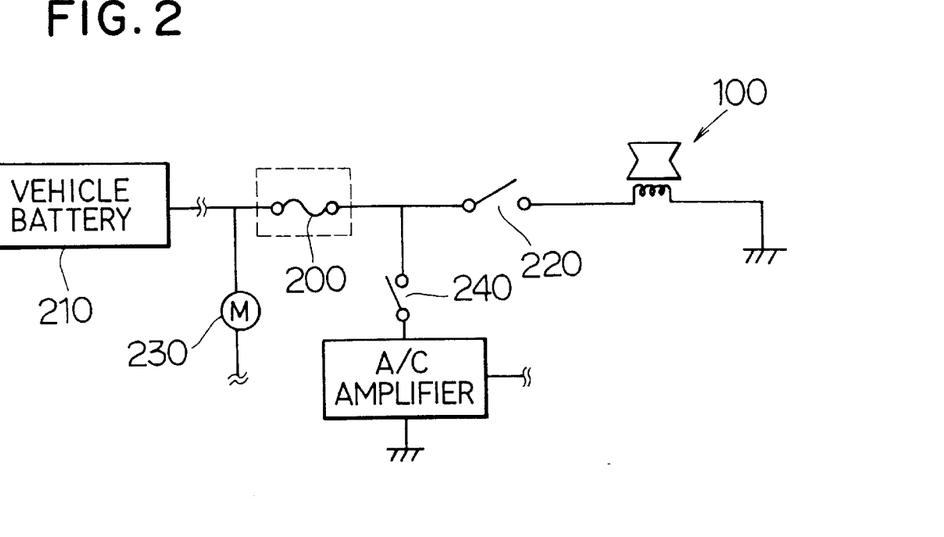
FIG. 2 is a schematic view showing an electric circuit of a vehicle air conditioner connected to the electromagnetic clutch according to the first embodiment.

Referring to FIG. 2, the clutch 100 is supplied with power from a battery 210 mounted on the vehicle through a fuse 200 (i.e., cut-off member). When electric current flowing through the fuse 200 exceeds a predetermined value, the fuse 200 is fused so that power supply to the clutch 100 is stopped. The clutch 100 is also turned on and off by a relay 220. The vehicle air conditioner is activated by a starting switch 240, and a blower for the vehicle air conditioner is driven by an electric motor 230.

Next, operation of the clutch 100 according to the first embodiment of the present invention will be described.

When the vehicle engine is operated and the clutch 100 is supplied with power from the battery 210 through the fuse 200, the armature 130 is attracted to the rotor housing 120 and makes contact with the friction surface 122 of the rotor housing 120. When the compressor is locked while the armature 130 is in contact with the friction surface 122, the armature 130 stops rotating while the rotor housing 120 continues to rotate. As a result, relatively large frictional heat is generated between the armature 130 and the friction surface 122, and both the stator housing 113 and the rotor housing 120 are heated.

When the frictional heat is increased and temperature of the stator housing 113 exceeds the melting point of the metal member 152, the metal member 152 starts melting. The melted metal member 152 flows through the passage 115 and reaches the terminal 116 by gravity and capillary action. As a result, the terminals 115, 116 are connected to each other, thereby short-circuiting the exciting coil 111 between the terminals 115, 116, i.e., between the initial winding end and the final winding end thereof. Therefore, excessive amount of current flows through the fuse 200, and the fuse 200 is fused. As a result, power supply to the clutch 100 is stopped and the armature 130 is separated from the friction surface 122.

Thus, in the first embodiment, when frictional heat between the armature 130 and the rotor housing 120 exceeds a predetermined value, the exciting coil 111 is short-circuited by a short-circuit member 150. The short-circuit member 150 includes the passage 151 partially filled with the metal member 152.

According to the first embodiment of the present invention, the clutch 100 does not need have a cut-off member for cutting off an electric circuit due to frictional heat such as a thermal fuse connected to the electric circuit between the terminals 115, 116 in the clutch 100. Therefore, the clutch 100 does not require a space for accommodating the thermal fuse nor a connection portion between the thermal fuse and the electric circuit. As a result, the size and production cost of the clutch 100 are decreased in comparison with a conventional electromagnetic clutch having a thermal fuse therein, without increasing power consumption of the clutch 100.

Further, in the conventional electromagnetic clutch, the thermal fuse needs to be disposed adjacent to an armature to be sensitive to frictional heat. As a result, an exciting coil is moved outwardly, thereby increasing a size of the clutch in an axial direction thereof. On the other hand, when the thermal fuse is disposed in the clutch without increasing the size of the clutch, the number of windings of the exciting coil needs to be decreased. In this case, power consumption of the clutch is increased.

According to the first embodiment, a condition (i.e., timing) for short-circuiting the exciting coil 111 of the clutch 100 is readily determined by appropriately setting the melting point of the metal member. Therefore, the short-circuit member 150 does not need to be located adjacent to the friction surface 122 and the armature 130 to be sensitive to frictional heat, and the exciting coil 111 does not need to be moved rightwardly in FIG. 1. Therefore, the size of the clutch 100 in the axial direction thereof is restricted from increasing, without increasing power consumption of the clutch 100.

Further, the clutch 100 has no connection portion between the thermal fuse and the electric circuit therein. As a result, there is no need to consider the fatigue strength of the connection portion due to vibration, cryogenic cycle or the like. Therefore, the reliability and durability of the clutch 100 are improved in comparison with the conventional clutch.

Furthermore, in the clutch 100 according to the first embodiment, the exciting coil 111 is short-circuited between the terminals 115, 116. Therefore, the exciting coil 111 is short-circuited with an improved response to frictional heat in comparison with an exciting coil which is short-circuited between covered wire portions thereof.

Further, in the clutch 100 according to the first embodiment, a part of the metal member 152 directly makes contact with the stator housing 113. Therefore, frictional heat is immediately transmitted to the metal member 152. As a result, the exciting coil 111 is short-circuited with a further improved response to frictional heat.

In the first embodiment, the metal member 152 makes contact with not only the stator housing 113 but also the terminal 115. This is because the stator housing 113 is grounded through the terminal 115 so that the stator housing 113 and terminal 115 have the same potential. When the stator housing 113 and the terminal 115 do not have the same potential (i.e., the terminal 115 is connected to the positive pole), the metal member 152 needs to be separated from the terminal 115.

Further, in the first embodiment, the exciting coil 111 is short-circuited between the initial winding end and the final winding end thereof. Therefore, the short-circuit member 150 has a simpler structure than that of a short-circuit member which short-circuits an exciting coil between inner wire portions thereof.

(Second Embodiment)

A second embodiment of the present invention will be described with reference to FIGS. 3 and 4. In this and following embodiments, components which are substantially the same as those in previous embodiments are assigned the same reference numerals, and the explanation thereof will be omitted.

In the first embodiment, the melted metal member 152 flows through the passage 151 due to gravity. However, when the passage 151 is disposed substantially horizontally, the melted metal member 152 may not flow.

Figure 3:
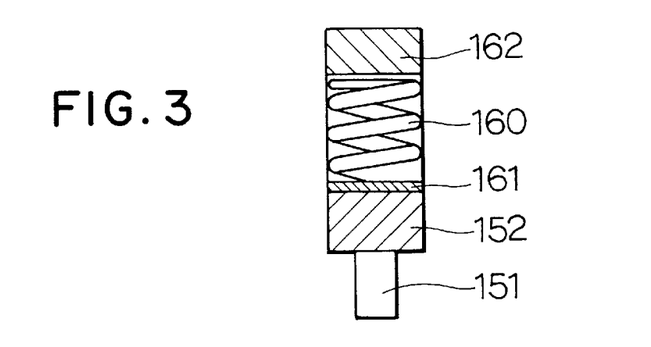
FIG. 3 is a schematic view showing a short-circuit member of an electromagnetic clutch according to a second preferred embodiment of the present invention.
Figure 4:
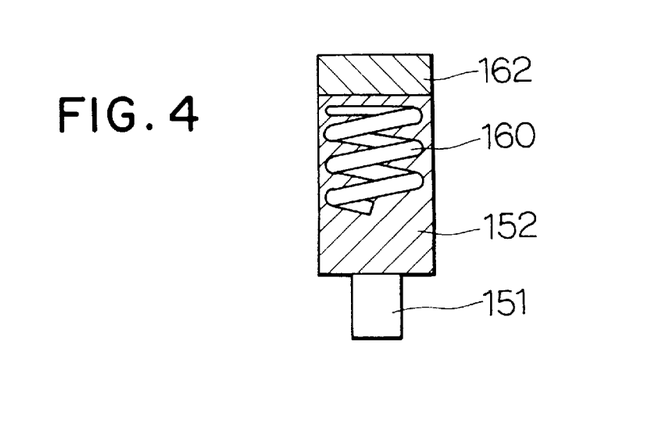
FIG. 4 is a schematic view showing another short-circuit member of the electromagnetic clutch according to the second embodiment.

In the second embodiment, as shown in FIGS. 3 and 4, a coil spring 160 (i.e., pushing member) is disposed in the passage 151 for pushing the metal member 152 in a direction in which the melted metal member 152 flows.

In FIG. 3, the metal member 152 is pushed by the coil spring 160 through a plate 161 toward the terminal 116 (i.e., downwardly in FIG. 3). In FIG. 4, the compressed coil spring 160 is embedded in the solid-state metal member 152. When the metal member 152 melts, the coil spring 160 is elongated, thereby pushing the melted metal member 152 toward the terminal 116 (i.e., downwardly in FIG. 4). Further, as shown in FIGS. 3 and 4, a lid 162 closes one end of the passage 151. The lid 162 is made of non-conductive material having excellent heat resistance such as resin. In the second embodiment, the lid 162 is made of nylon.

According to the second embodiment, even when the passage 151 is disposed substantially horizontally, the melted metal member 152 smoothly flows through the passage 151 due to the coil spring 160 so that the exciting coil 111 is short-circuited between the terminals 115, 116. As a result, reliability of the short-circuit member 150 of the clutch 100 is improved (Third Embodiment)

Figure 5:
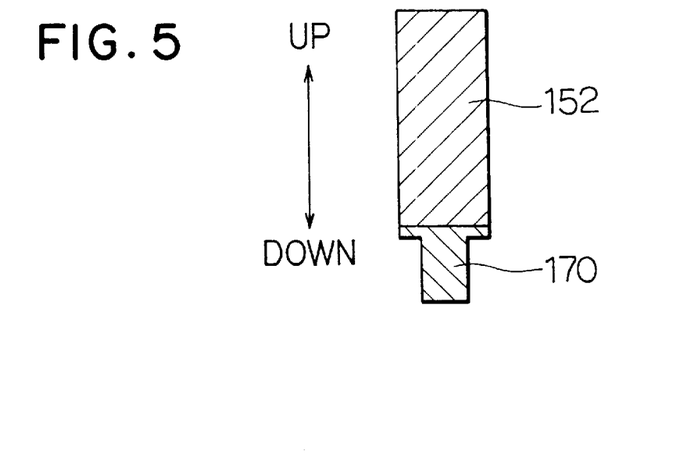
FIG. 5 is a schematic view showing a short-circuit member of an electromagnetic clutch according to a third preferred embodiment of the present invention.

A third preferred embodiment of the present invention will be described with reference to FIG. 5. In the third embodiment, a downstream end portion of the passage 151 with respect to flowing of the melted metal member 152 (i.e., an end portion of the passage 151 adjacent to the terminal 116) is filled with a flux 170. The flux 170 is a flow accelerator for increasing fluidity of the melted metal member 152.

According to the third embodiment, the melted metal member 152 more smoothly flows through the passage 151 due to the flux 170. As a result, reliability of the short-circuit member 150 of the clutch 100 is improved.

(Fourth Embodiment)

Figure 6:
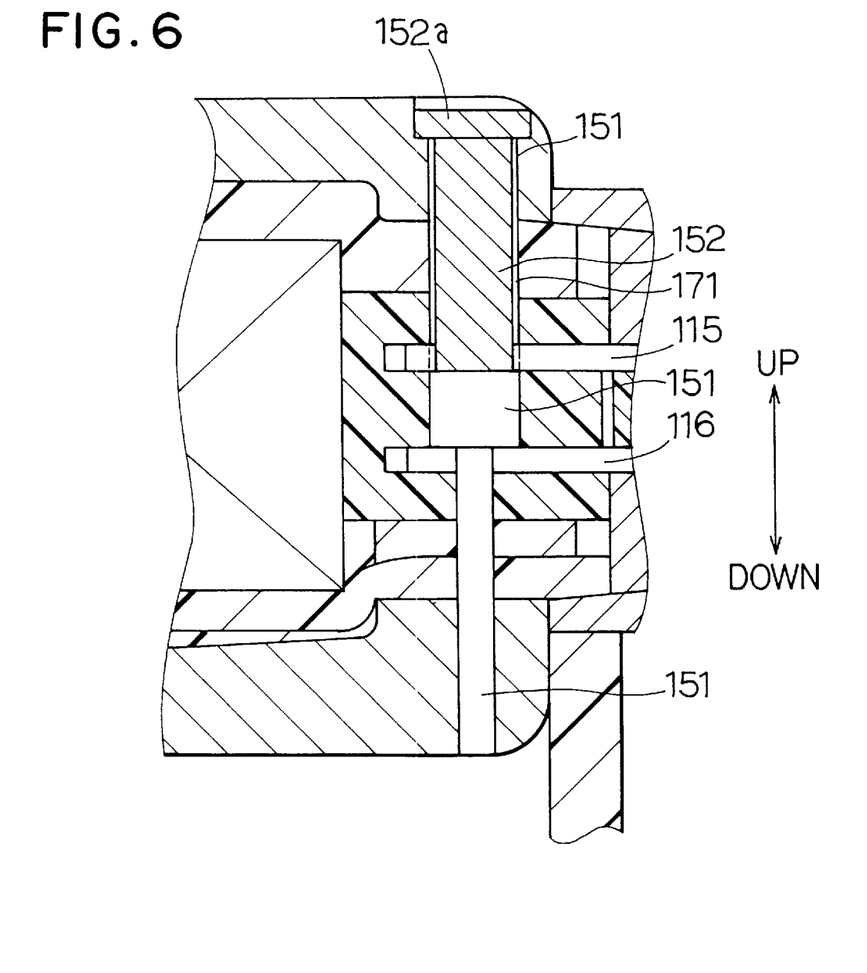
FIG. 6 is a schematic view showing a short-circuit member of an electromagnetic clutch according to a fourth preferred embodiment of the present invention.

A fourth preferred embodiment of the present invention will be described with reference to FIG. 6. In the fourth embodiment, a diameter of the passage 151 is set to be larger than a diameter of the solid metal member 152 so that a gap 171 is formed between an inner wall of the passage 151 and the metal member 152. Further, the passage 151 is downwardly extended and penetrates the outer peripheral surface of the stator housing 113 facing the hub center 141 so that the passage 151 communicates with an outer space.

Furthermore, in the fourth embodiment, the metal member 152 has a flange portion 152a formed on an upper surface of the metal member 152. The flange portion 152a engages with the outer peripheral surface of the stator housing 113, thereby restricting the solid metal member 152 from dropping downwardly toward the terminal 116.

According to the fourth embodiment, the gap 117 is formed between the inner wall of the passage 151 and the solid metal member 152. Therefore, even when the metal member 152 melts, the metal member 152 is restricted from adhering to the inner wall of the passage 151 due to surface tension thereof. As a result, fluidity of the melted metal member 152 is improved, and reliability of the short-circuit member 150 is improved.

Further, in the fourth embodiment, the passage 151 communicates with the outer space. Therefore, when the metal member 152 melts and flows, air in the passage 151 is smoothly discharged outside. As a result, the metal member 152 flows more smoothly through the passage 151, and reliability of the short-circuit member 150 is further improved.

(Fifth Embodiment)

A fifth preferred embodiment of the present invention will be described with reference to FIGS. 7 and 8. In the fifth embodiment, a column 172 is integrally formed with the lid 162 in the second embodiment to extend in a longitudinal direction of the passage 151 (i.e., vertical direction) while penetrating the metal member 152. Further, flow acceleration portions 173a, 173b for increasing fluidity of the melted metal member 152 are formed around a lower part of the column 172 adjacent to the terminal 116.

Figure 7:
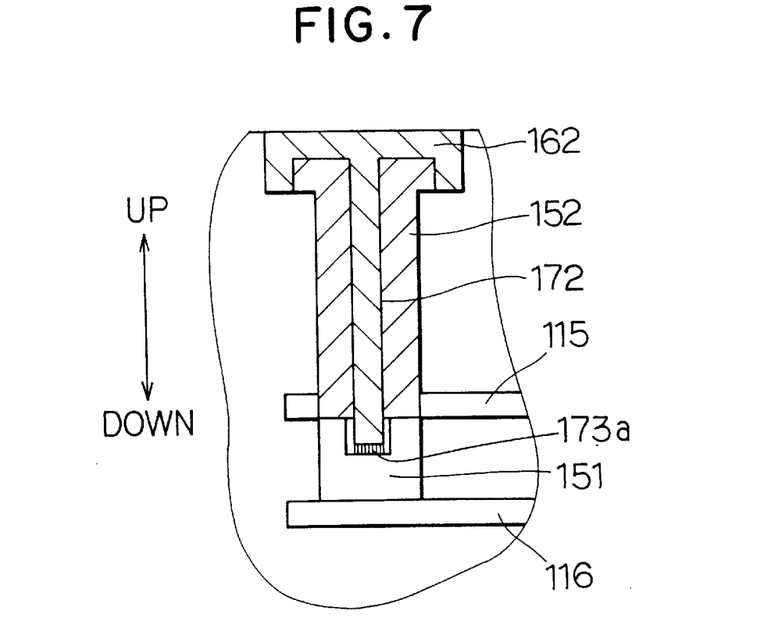
FIG. 7 is a schematic view showing a short-circuit member of an electromagnetic clutch according to a fifth preferred embodiment of the present invention.
Figure 8:
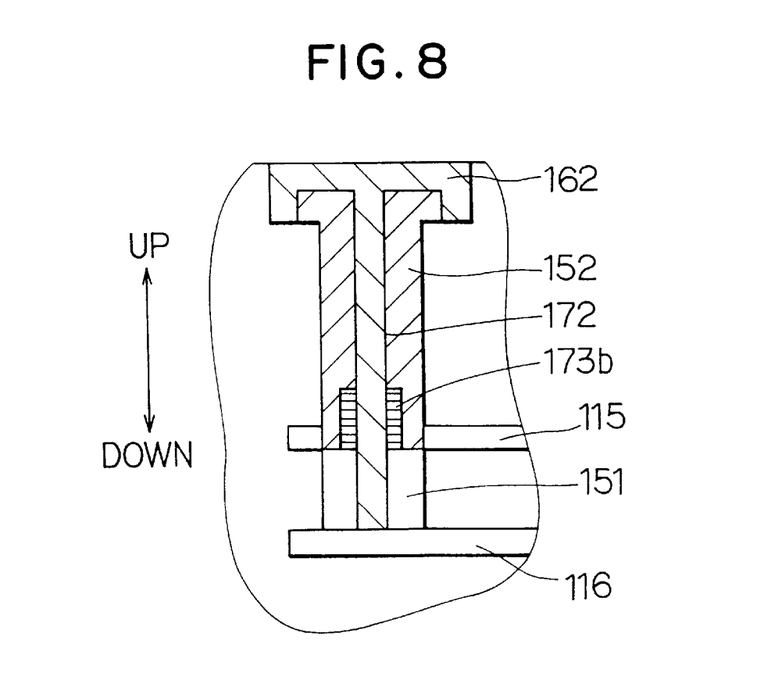
FIG. 8 is a schematic view showing another short-circuit member of the electromagnetic clutch according to the fifth embodiment.

In FIG. 7, a lower end of the column 172 is tinned, thereby forming the flow acceleration portion 173a. In FIG. 8, a flux is embedded in the metal member 152 adjacent to the lower part of the column 172, thereby forming the flow acceleration portion 173b.

According to the fifth embodiment, the melted metal member 152 smoothly flows through the passage 151 due to the flow acceleration portions 173a, 173b, and reliability of the short-circuit member 150 is improved.

(Sixth Embodiment)

Figure 9:
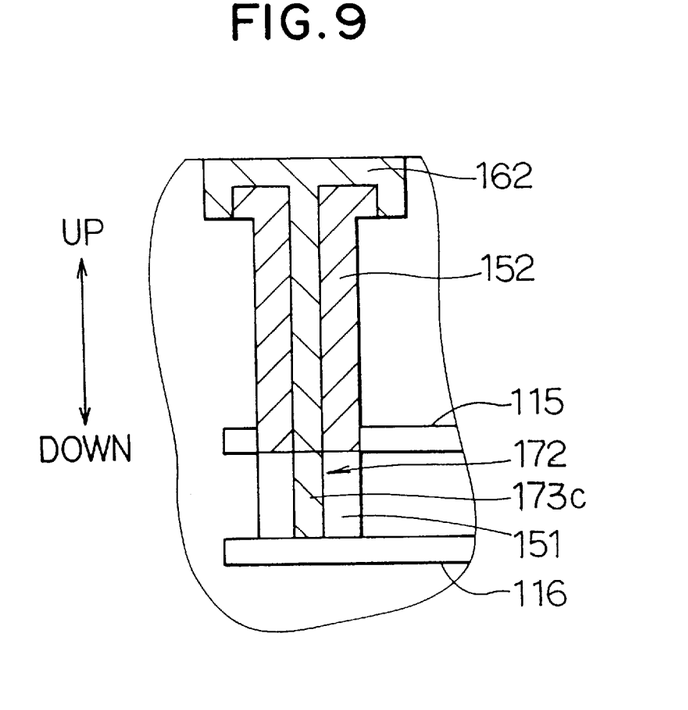
FIG. 9 is a schematic view showing a short-circuit member of an electromagnetic clutch according to a sixth preferred embodiment of the present invention.

A sixth preferred embodiment of the present invention will be described with reference to FIG. 9. In the sixth embodiment, the column 172 is extended to the terminal 116 so that the column 172 bridges between the terminals 115, 116. Further, a spiral groove 173c is formed on an outer circumferential surface of the column 172.

According to the sixth embodiment, the melted metal member 152 flows through the spiral groove 173c by capillary action and reaches the terminal 116. As a result, reliability of the short-circuit member 150 is further improved.

(Seventh Embodiment)

Figure 10:
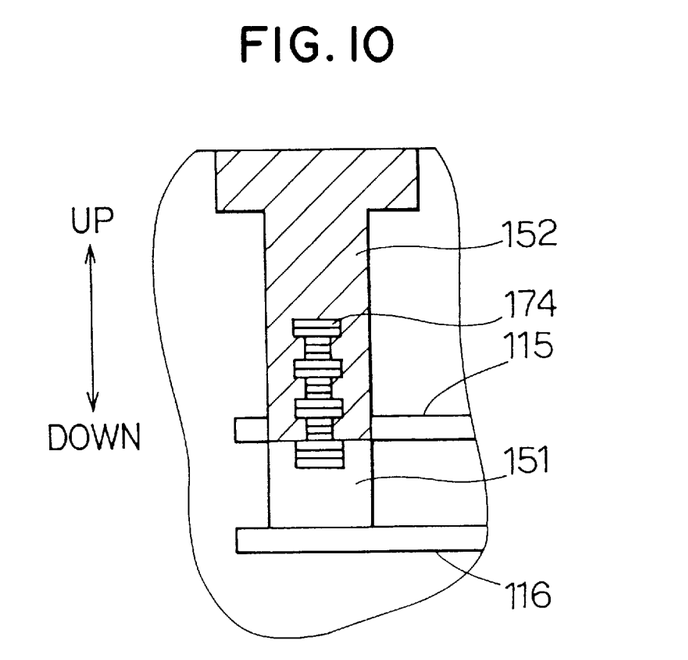
FIG. 10 is a schematic view showing a short-circuit member of an electromagnetic clutch according to a seventh preferred embodiment of the present invention.

A seventh preferred embodiment of the present invention will be described with reference to FIG. 10. In the seventh embodiment, a conductive metal chip 174 is embedded in the metal member 152 as shown in FIG. 10. When the metal member 152 melts, the metal chip 174 drops downwardly due to own weight and makes contact with the terminal 116 by one end thereof, while the other end thereof is still in contact with the terminal 115. As a result, the exciting coil 111 is short-circuited.

According to the seventh embodiment, short-circuit performance of the exciting coil 111 is not influenced by fluidity of the metal member 152. Therefore, in the seventh embodiment, reliability of the short-circuit member 150 is further improved in comparison with the above-mentioned first through sixth embodiments.

In the above-mentioned first through seventh embodiments, the metal member 152 is made of conductive metal having a melting point lower than that of the stator housing 113 such as solder. However, the metal member 152 may be made of conductive resin formed by mixing resin and conductive powder such as metal powder. Further, the metal member 152 may be made of shape memory metal, bimetal, which is formed by laminating various metal sheets having different thermal expansion coefficients and changes a shape according to temperature, or the like.

Further, in the above-mentioned first through seventh embodiments, the exciting coil 111 is static to the compressor; however, the exciting coil 111 may integrally rotate with the pulley 121.

Furthermore, in the above-mentioned first through seventh embodiments, the exciting coil 111 is short-circuited between the initial winding end and the final winding end thereof. However, the exciting coil 111 may be short-circuited between inner or outer covered wire portions thereof.

Although the present invention has been fully described in connection with a preferred embodiment thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating a magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said coil has a pair of terminals for supplying power to said coil; and said short-circuit member short-circuits said coil between said pair of terminals.

2. The electromagnetic clutch according to claim 1, wherein said short-circuit member short-circuits said coil between an initial winding end of said coil and a final winding end of said coil.

3. The electromagnetic clutch according to claim 1, wherein said short-circuit member is in contact with said housing.

4. The electromagnetic clutch according to claim 1, wherein:

said short-circuit member includes a conductive member made of conductive material having a melting point lower than that of said housing; and said short-circuit member short-circuits said coil when said conductive member melts due to said frictional heat.

5. The electromagnetic clutch according to claim 1, wherein:

said short-circuit member includes a first conductive member made of conductive material having a melting point lower than that of said housing and a second conductive member having a melting point higher than that of said first conductive member and embedded in said first conductive member; and said second conductive member short-circuits said coil when said first conductive member melts due to said frictional heat so that said second conductive member moves.

6. The electromagnetic clutch according to claim 4, wherein said short-circuit member includes a pushing member for pushing said conductive member in a direction in which said melted conductive member flows.

7. The electromagnetic clutch according to claim 4, wherein:

said short-circuit member includes a passage through which said melted conductive member flows;

said passage extends in a vertical direction; and a predetermined gap is formed between an inner surface of said passage and said conductive member in a solid state.

8. The electromagnetic clutch according to claim 7, wherein said passage communicates with an outer space.

9. The electromagnetic clutch according to claim 4, wherein said short-circuit member includes a flow acceleration member for increasing fluidity of said melted conductive member.

10. The electromagnetic clutch according to claim 4, wherein:

said short-circuit member includes a passage through which said melted conductive member flows and a column portion which extends through said passage in a longitudinal direction of said passage while penetrating said conductive member;

said column portion has a flow acceleration member for increasing fluidity of said melted conductive member, disposed at a downstream side portion of said column portion with respect to a direction in which said melted conductive member flows.

11. The electromagnetic clutch according to claim 10, wherein said flow acceleration member is made of a spiral groove formed in an outer circumferencial surface of said column portion.

12. The electromagnetic clutch according to claim 4, wherein said conductive member is made of solder.

13. An electromagnetic clutch comprising:

a coil for generating a magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said coil has a pair of terminals for supplying power to said coil; and said short-circuit member short-circuits said coil between said pair of terminals.

14. An electromagnetic clutch comprising:

a coil for generating a magnetic field;

a housing accommodating said coil;

an armature being attracted to said housing when said magnetic field is generated;

a short-circuit member for short-circuiting said coil when frictional heat generated between said armature and said housing exceeds a predetermined value; and a cut-off member which ceases power supply to said electromagnetic clutch when current flowing through said cut-off member exceeds a predetermined value, said cut-off member being externally connected to said electromagnetic clutch;

wherein said coil has a pair of terminals for supplying power to said coil; and said short-circuit member short-circuits said coil between said pair of terminals.

15. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating a magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said short-circuit member includes a conductive member made of conductive material having a melting point lower than that of said housing;

said short-circuit member short-circuits said coil when said conductive member melts due to said frictional heat; and said short-circuit member includes a pushing member for pushing said conductive member, in a direction in which said melted conductive member flows.

16. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating a magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said short-circuit member includes a conductive member made of conductive material having a melting point lower than that of said housing;

said short-circuit member short-circuits said coil when said conductive member melts due to said frictional heat;

said short-circuit member includes a passage through which said melted conductive member flows;

said passage extends in a vertical direction; and a predetermined gap is formed between an inner surface of said passage and said conductive member in a solid state.

17. The electromagnetic clutch according to claim 16, wherein said passage communicates with an outer space.

18. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said short-circuit member includes a conductive member made of conductive material having a melting point lower than that of said housing;

said short-circuit member short-circuits said coil when said conductive member melts due to said frictional heat; and said short-circuit member includes a flow acceleration member for increasing fluidity of said melted conductive member.

19. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said short-circuit member includes a conductive member made of conductive material having a melting point lower than that of said housing;

said short-circuit member short-circuits said coil when said conductive member melts due to said frictional heat;

said short-circuit member includes a passage through which said melted conductive member flows and a column portion which extends through said passage in a longitudinal direction of said passage while penetrating said conductive member; and said column portion has a flow acceleration member for increasing fluidity of said melted conductive member, disposed at a downstream side portion of said column portion with respect to a direction in which said melted conductive member flows.

20. The electromagnetic clutch according to claim 19, wherein said flow acceleration member is made of a spiral groove formed in an outer circumferential surface of said column portion.

21. An electromagnetic clutch for power transmission, said electromagnetic clutch being supplied with power through a cut-off member which ceases power supply to said electromagnetic clutch when current flowing through said cut-off member exceeds a predetermined value, said electromagnetic clutch comprising:

a coil for generating magnetic field;

a housing accommodating said coil;

an armature being attracted to said housing when said magnetic field is generated; and a short-circuit member for short-circuiting said coil when frictional heat generated between said armature and said housing exceeds a predetermined value;

wherein said short-circuit member includes a first conductive member made of conductive material having a melting point lower than that of said housing and a second conductive member having a melting point higher than that of said first conductive member and embedded in said first conductive member; and said second conductive member short-circuits said coil when said first conductive member melts due to said frictional heat so that said second conductive member moves.

* * * * *